Patented Aug. 10, 1948

2,446,916

UNITED STATES PATENT OFFICE 2,446,916

THERAPEUTIC COMPOSITION

Louis Freedman, Mount Vernon, N. Y., assignor to U. S. Vitamin Corporation, New York, N. Y., a corporation of Delaware No Drawing. Application February 27, 1946, Serial No. 650,742

7 Claims. (Cl. 167—55)

The invention relates to a composition having therapeutic properties. More particularly it pertains to a composition of matter containing an anti-hypertension compound and includes correlated improvements and discoveries whereby the stability of the compound is enhanced.

An object of the invention is the provision of a composition of matter adapted for reduction of blood pressure, and which also possesses the property of a diuretic.

A further object of the invention is to provide a composition of matter having an anti-hypertensive and diuretic effect that does not undergo substantial change over an extended period of time.

Another object of the invention is the provision of a composition having therapeutic properties that may be readily and economically produced to a desired extent.

An additional object of the invention is the provision of a composition including a hexahydric alcohol hexanitrate, a xanthine derivative, and a nicotinic acid compound.

A specific object of the invention is to provide a composition of matter having therapeutic qualities and containing mannitol hexanitrate, a xanthine derivative, and calcium nicotinate, and in which the hexanitrate does not undergo substantial decomposition.

Other objects of the invention will in part be obvious and will in part appear hereinafter.

The invention accordingly comprises a composition of matter possessing the characteristics, properties and the relation of components which will be exemplified in the composition hereinafter described and the scope of the invention which will be indicated in the claims.

In the practice of the invention a composition having anti-hypertensive and diuretic qualities is prepared and such composition comprises a hexahydric alcohol hexanitrate, a desensitizing agent therefor, a xanthine derivative having diuretic properties, and a member of the group consisting of nicotinic acid and salts thereof. efficacy of the composition may be attributed to the dilating action upon the small blood vessels and the relaxing effect upon smooth muscles of the hexanitrate in combination with the diuretic effect of a xanthine derivative. The hexanitrates are characterized further by an explosive tendency, and this tendency or sensitiveness is obviated by the inclusion of a desensitizing agent therefor, which, in order to overcome the explosive properties, should be present in an amount of at least nine parts for each part of the hexanitrate, and more desirably in an amount from about eleven to about thirteen parts.

Various hexahydric alcohol hexanitrates may be utilized, and more particularly the hexanitrates of sorbitol, mannitol and dulcitol. Preferably the hexanitrate of mannitol is included.

As desensitizers, it has been found that carbohydrates effect ample desensitization, and more especially a finely subdivided cellulose, for example alpha cellulose, starches, dextrins, and sugars and sugar alcohols which may be lactose, specifically beta-lactose, sucrose, dextrose, galactose, mannose, sorbitol, and mannitol. As indicated the hexanitrate when accompanied by a desensitizer no longer tends to decompose rapidly or explode, and consequently may be utilized, without hazard, in accordance with the present invention as a therapeutic agent having an anti-hypertensive action. The xanthine derivative may be caffeine, theobromine and theophylline and derivatives thereof such as those which are more readily soluble and compatible with the hexanitrate. Compositions containing theobromine or theophylline are preferred.

While the mannitol hexanitrate accompanied by a desensitizing agent remains stable for a considerable time, nevertheless the tendency to decompose slowly in the presence either of acidic or alkaline compounds is not thereby overcome. Consequently when a xtanthine derivative having diuretic properties is combined with a hexahydric alcohol hexanitrate, e. g. mannitol hexanitrate, desensitized with beta-lactose in proportion of one to eleven, there is a tendency for the xanthine derivative which is amphoteric to show acidic properties, thus causing progressive decomposition of the nitrate groups with slow formation of nitrous acid. This decomposition although relatively slow, is sufficient to affect the stability of the composition, and accordingly shortens the effective period of use.

I have found that the incorporation of a relatively small amount of a member of the group consisting of nicotinic acid and its salts into the composition has the property of stabilizing or offsetting the decomposition of the hexanitrate due to the presence of a xanthine derivative. As indicated not only does nicotinic acid possess a stabilizing influence, but such also is a property of the salts of nicotinic acid, and more particularly of the sodium, potassium, ammonium, calcium, and magnesium salts. Accordingly, a composition containing a desensitized hexahydric alcohol hexanitrate, and a xanthine derivative is stabilized for a considerable period of time. It hence may be safely marketed and therapeutically used as such through the inclusion of nicotinic acid and its salts.

As an illustrative embodiment of a manner in which the invention may be practiced, the following examples are presented. The parts are by weight.

Example A 19.45 grams of a powdered mixture comprising 11 parts by weight of beta-lactose and 1 part by weight of mannitol hexanitrate are ground together with 8.1 grams of theobromine and 0.87 gram of calcium nicotinate until a complete and uniform mixture is obtained. This mixture contains the percentages of ingredients as follows:

|  | Percent |
|---|---|
| Mannitol hexanitrate | 5.7 |
| Beta-lactose | 62.74 |
| Theobromine | 28.5 |
| Calcium nicotinate | 3.06 |

The above mixture can be screened and used in powder form as such or in hard or soft gelatin capsules, or it may be granulated and made into tablets in various sizes depending on therapeutic doses required.

Example B 19.45 grams of a powdered mixture comprising 11 parts by weight of beta-lactose and 1 part by weight of mannitol hexanitrate are ground together with 16.2 grams of theobromine and 0.87 gram of calcium nicotinate until a complete and uniform mixture is obtained. This mixture contains the percentages of ingredients as follows:

|  | Per cent |
|---|---|
| Mannitol hexanitrate | 4.44 |
| Beta-lactose | 48.80 |
| Theobromine | 44.40 |
| Calcium nicotinate | 2.36 |

The above mixture can be processed and used as described under Example A.

Example C 19.45 grams of a powdered mixture comprising 11 parts by weight of beta-lactose and 1 part by weight of mannitol hexanitrate are ground together with 3.24 grams of theophylline and 0.87 gram of calcium nicotinate, until a complete and uniform mixture is obtained. This mixture contains the percentages of ingredients as follows:

|  | Per cent |
|---|---|
| Mannitol hexanitrate | 6.87 |
| Beta-lactose | 75.68 |
| Theophylline | 13.75 |
| Calcium nicotinate | 3.70 |

Further processing and use may be as in Example A.

Example D 19.45 grams of a powdered mixture comprising 11 parts by weight of beta-lactose and 1 part by weight of mannitol hexanitrate are ground together with 7.5 grams of theophylline and 0.87 gram of calcium nicotinate until a complete and uniform mixture is obtained. This mixture contains the percentages of ingredients as follows:

|  | Per cent |
|---|---|
| Mannitol hexanitrate | 5.82 |
| Beta-lactose | 64.10 |
| Theophylline | 26.95 |
| Calcium nicotinate | 3.13 | and may be further processed and used as in Example A.

The proportions of the hexanitrate and of the xanthine derivative may be varied, but it has been found that effective therapeutic use depends upon utilization of amounts which are within those given in the above examples. Although the amount of nicotinic acid and its salts, as calcium nicotinate, necessary to effect stabilization of the hexanitrate may be varied over a relatively wide range, nevertheless this amount should be, as a minimum, upwards from about 50% of the hexanitrate, that is substantially not less than one-half of the quantity of hexanitrate present in the composition.

Furthermore, the quantity of desensitizing agent, as the lactose, may also be modified. It will be realized that such amount must be sufficient completely to desensitize or overcome the explosive tendency of the hexanitrate. I have found that the sugars and sugar alcohols are particularly well adapted as desensitizing agents. Moreover the utilization of a salt of nicotinic acid is governed by the fact that such salt should be without deleterious or toxic effect.

As above pointed out the therapeutic compositions are characterized by causing dilation of small blood vessels and relaxation of smooth muscle hence occasioning a relaxing of the coronary vessels with reduction in blood pressure, and by a marked diuretic action. Accordingly, the compositions are particularly efficacious in cases of essential hypertension associated with the cardiac conditions of edema and angina pectoris.

That the compositions herein described have distinct stability has been demonstrated by a series of pH surveillance tests at 47–48° C. The test is conducted in the following manner. An extract of the material is made by shaking a five gram sample in 10 cc. of freshly distilled water for five minutes, and the pH value of the clear solution so obtained is measured by means of a pH meter. The test was made on a freshly prepared composition, and at weekly intervals with storage at the above stated temperature.

Table 1 gives the results of such a test with four mixes, namely, mixes I, II, III, and IV. The composition of the mixes was as follows: I, mannitol hexanitrate one part, beta-lactose eleven parts; II, mix I with theobromine in an amount of about 30%; III, mix I with theobromine in an amount of about 28.6%, and nicotinic acid about 2.7% (Example A); IV, mix I containing theophylline in an amount of about 13.8% and nicotinic acid about 3.2% (Example C).

*Table I*

| Time | I, pH | II, pH | III, pH | IV, pH |
|---|---|---|---|---|
| Start of Test | 5.2 | 4.6 | 3.4 | 3.35 |
| 2 weeks | 5.2 | 4.5 | 3.35 | 3.35 |
| 4 weeks | 5.1 | 4.35 | 3.4 | 3.45 |
| 8 weeks | 5.0 | 4.0 | 3.25 | 3.3 |
| 12 weeks | 4.9 | 4.1 | 3.3 | 3.4 |
| 16 weeks | 4.8 | 3.9 | 3.0 | 3.4 |

It will be observed that the mixes II, III, and IV had a definite acid reaction when prepared, and that although the addition of the xanthine at first tends to increase the acidity moderately, nevertheless the composition becomes progressively more acid during storage and hence unstable as shown under II. The addition of nicotinic acid makes the mix still more acid initially, but this acidity is stabilized during storage, thus indicating the stabilizing action of the nicotinic acid, mixes III and IV.

Instability of the nitro groups may be shown by the methyl violet test at 60° C. which indicates the presence of free nitrous acid arising from the decomposition of the nitro groups in the hexanitrate, as mannitol hexanitrate. When exposed to the vapors of nitrous acid, methyl violet paper changes from violet, to blue, to gray, to colorless, depending upon the amount of nitrous acid present, and this in turn indicates the extent of decomposition of the product. While nicotinic acid has a stabilizing action, I have found that the salts thereof, more especially calcium and sodium nicotinates, markedly reduce the acidity of such compositions, and that the pH value thereof approaches neutrality. Additionally the products containing calcium nicotinate were characterized by distinctive stability as measured by the pH surveillance test, and confirmed by the methyl violet test. This is shown in Table 2, which sets forth the results of storage tests conducted at 47-48° C. The mixes were as follows: V, mannitol hexanitrate-beta-lactose 68.5%, theobromine 28.5%, calcium nicotinate 3% (Example A); VI, mannitol hexanitrate-beta-lactose 82.6%, theophylline 13.7%, and calcium nicotinate 3.7% (Example C); VII, mannitol hexanitrate-beta-lactose 68.5%, theobromine 28.5%, sodium nicotinate 3% (corresponds to Example A); VIII, mannitol hexanitrate-beta-lactose 82.6%, theophylline 13.7%, sodium nicotinate 3.7% (corresponds to Example C).

*Table 2*

| Time | V, pH | VI, pH | VII, pH | VIII, pH |
| --- | --- | --- | --- | --- |
| Start of test | 5.9 | 5.7 | 6.2 | 6.0 |
| 4 weeks | 6.0 | 5.8 | 5.6 | 5.4 |
| 8 weeks | 6.2 | 5.85 | 5.6 | 5.5 |
| 12 weeks | 5.9 | 5.7 | 5.25 | 5.2 |
| 16 weeks | 5.8 | 5.6 | 5.15 | 5.1 |

The proportions of ingredients as above given other than the salts of nicotinic acid are not limitative but rather representative of those proportions which are suitable for therapeutic use. Thus, the amounts of the xanthines and of the nicotinates may be increased or decreased with respect to each other within limits of therapeutic requirements. However, the amount of calcium nicotinate relative to the hexanitrate is critical with respect to its minimum limit, and this limit is that the amount of nicotinic acid and its salts should be substantially not less than one-half of the amount of the hexanitrate, i. e. upwards from about 50% of the hexanitrate. It will be noted that although the compositions containing sodium nicotinate have a higher pH when initially prepared than those containing calcium nicotinate, nevertheless, there is a progressive drop in the pH value in such compositions indicating an increased acidity thereof, whereas in the compositions containing calcium nicotinate, there is substantially no change in pH value. It has thus been demonstrably shown that salts of nicotinic acid bring about a marked and highly satisfactory result when included in compositions containing a desensitized hexahydric alcohol hexanitrate and a xanthine derivative having diuretic properties.

Since certain changes may be made in the above composition of matter and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A composition of matter comprising a hexahydric alcohol hexanitrate, a desensitizing agent therefor, a xanthine derivative having diuretic properties, and a member of the group consisting of nicotinic acid and salts thereof.

2. A composition of matter comprising mannitol hexanitrate, a sugar, a xanthine derivative having diuretic properties, and a member of the group consisting of nicotinic acid and salts thereof.

3. A composition of matter comprising mannitol hexanitrate, a sugar, caffeine, and calcium nicotinate in an amount upwards from about 50% of the hexanitrate.

4. A composition of matter comprising mannitol hexanitrate, a sugar, theobromine, and calcium nicotinate in an amount upwards from about 50% of the hexanitrate.

5. A composition of matter comprising mannitol hexanitrate, a sugar, theophylline, and calcium nicotinate in an amount upwards from about 50% of the hexanitrate.

6. A composition of matter comprising a desensitized hexahydric alcohol hexanitrate, a xanthine derivative having diuretic properties, and a member of the group consisting of nicotinic acid and the salts thereof.

7. A composition of matter comprising a desensitized mannitol hexanitrate, a xanthine derivative having diuretic properties, and calcium nicotinate in an amount upwards from about 50% of the hexanitrate.

LOUIS FREEDMAN.

REFERENCES CITED

The following references are of record in the file of this patent:

U. S. Dispensatory, 23rd Edition (1943), pages 39, 40, 222, 223, 1094, 1124, 1125, 1126, 1434.